United States Patent [19]

Lenke et al.

[11] Patent Number: 4,868,231
[45] Date of Patent: Sep. 19, 1989

[54] THICKENED MOLDING RESIN COMPOUNDS AND CURED MOLDED COMPOUNDS

[75] Inventors: Gerd M. Lenke, Mogadore; Hubert J. Fabris, Akron; Earl G. Melby, Uniontown, all of Ohio

[73] Assignee: GenCorp Inc., Fairlawn, Ohio

[21] Appl. No.: 199,725

[22] Filed: May 27, 1988

[51] Int. Cl.$^4$ .............................................. C08L 67/06
[52] U.S. Cl. ..................... 523/512; 523/527; 525/28; 525/419; 525/449
[58] Field of Search ............... 525/28, 449, 419; 523/512, 527

[56] References Cited

U.S. PATENT DOCUMENTS

| | | | |
|---|---|---|---|
| 4,073,828 | 2/1978 | Ferrarini et al. | 264/294 |
| 4,129,641 | 12/1978 | Ferrarini et al. | 264/294 |
| 4,296,020 | 10/1981 | Magrans, Jr. | 525/28 |

Primary Examiner—Patricia Short

[57] ABSTRACT

Sheet molding compounds are thickened (or maturated) via "in situ" formation of polyureas made from aromatic primary diamines with reduced basicity and diisocyanates. The molding compounds, which can optionally contain mineral fillers such as chopped glass fiber, are generally based upon unsaturated polyester resins having a high percentage of hydroxyl end groups, polymerizable vinyl compounds such as styrene, and the like. The thickened compositions are tack-free and compression moldable after less than one day, typically after less than several hours, into permanently shaped, strong rigid articles, such as automotive body parts. A viscosity plateau is reached and maintained by the maturated compounds of the present invention for extended periods of time, e.g., several weeks.

19 Claims, 1 Drawing Sheet

THICKENED MOLDING RESIN COMPOSITIONS AND CURED MOLDED COMPOUNDS

FIELD OF THE INVENTION

The present invention relates to maturated molding resins made from polyester prepolymers having a high hydroxyl end group content and ethylenically unsaturated monomers which are thickened by utilizing in situ polyureas made from generally a diisocyanate and an aromatic diamine. The present invention further relates to a process for the production of storage-stable, non-tacky, optionally glass- and mineral-filled polyester/styrene which can be compression molded and thermally set in less than one day, preferably less than several hours, after mixing of the components into permanently shaped, rigid articles.

BACKGROUND

Sheet molding compounds (SMC) have heretofore been made. An important area of use is in the manufacturing of automotive body parts. Typically, SMC's are prepared by mixing unsaturated polyesters with styrene, mineral fillers, low shrinkage (or low profile) resins, free-radical initiators and other additives. The resulting SMC pastes must be initially fluid enough to incorporate fillers such as chopped glass fibers needed for reinforcement. Good wetting of the glass fibers is essential for satisfactory adhesion of the cured molding compounds to the glass fiber and overall product properties. The viscosity of the molding compound should initially be low, for example below 100,000 centipoises and for the molding operation should be high, as for example at least $2 \times 10^7$ centipoises. The surface of the SMC paste should generally be tack-free. Current technology achieves maturation of the SMC paste based upon incorporation of MgO or $Mg(OH)_2$, which forms ionic bonds with the carboxyl terminated polyester resins. This route, however, has several disadvantages: (1) maturation times can be several days, (2) initial maturation rates and the final viscosities reached are very sensitive to moisture content of the pastes, (3) the maturation process continues and the pastes become too stiff and unusable for molding.

Various processes have been proposed to remedy the above problems. For example, Magrans U.S. Pat. No. 4,296,020 relates to ethylenically unsaturated monomer solutions of ethylenically unsaturated polyester, polyester urethane and polyisocyanurate resins which are quickly converted to moldable gels by the homogeneous formation of polyurea resins through the reaction of aliphatic polyamines and polyisocyanates. Although viscosity increases are achieved, such a system is generally not workable for mineral-filled and glass fiber reinforced unsaturated polyester based SMC. Moreover, viscosity buildup utilizing aliphatic diamines is too fast to permit sufficient fiberglass wetting. The use of conventional aromatic diamines are generally ineffective due to low solubility in the paste.

The polyamines utilized in U.S. Pat. No. 4,296,020 are different from the diamines of the present invention. In the Magrans patent, aliphatic polyamines are preferred. Such compounds have been found not to be workable for the maturation and molding of SMC compounds of the present invention, because: (1) they react too fast with di- or polyisocyanates leaving insufficient time for proper wetting of the glass fiber; a low viscosity induction period of at least five to ten minutes is needed;

(2) they are not effective or efficient in achieving high paste viscosities required for molding ($>2 \times 10^7$ cps); and (3) they are not inert toward the unsaturated polyester resins used in SMC's (e.g., see examples);, i.e., they undergo so-called "Michael additions" to the activated C-C double bonds of the polyesters; therefore, they cannot be premixed with the polyesters.

ICI U.S. Pat. Nos. 4,073,828 and 4,129,641 relate to the thickening of ethylenically unsaturated monomer solutions of unsaturated polyesters by first capping the hydroxyl terminated polyesters with diisocyanates and subsequently extending and/or crosslinking these prepolymers by the addition of diamines. Such a method is rather cumbersome and premature crosslinking is a problem as it effects moldability and final properties adversely.

SUMMARY OF THE INVENTION

It is therefore an aspect of the present invention to provide a thickened molding resin composition which is maturated to a viscosity plateau through the in situ formation of a polyurea. The molding resin contains styrene monomers with unsaturated polyester having high hydroxyl and low carboxyl end group content. The polyurea is made from a diisocyanate and generally specific types of primary aromatic diamines having basicity reducing substituents thereon. A paste formed by the in situ formation of the polyurea has initially a relatively low viscosity which permits the incorporation of reinforcement fibers. The wetting of the fibers is generally good. Unexpectedly, the polyurea matured paste remains quite stable (i.e. maintain relatively the same viscosity) during storage at room temperature for periods up to five or six months or more. Conventionally thickened pastes, in contrast, generally become unsuitable for molding often within a week. Shaped articles can be produced from the fiber reinforced paste by compression molding and curing.

DETAILED DESCRIPTION OF THE INVENTION

The sheet molding resin components of the present invention generally include an unsaturated polyester resin and an olefinically unsaturated monomer which is capable of polymerizing with said polyester. Other components include a thermoplastic polymer to control mold shrinkage, a free radical catalyst, such as an organic peroxide, an inhibitor, a suitable thickener, internal mold release agents, and various chopped fibers.

Various types of unsaturated polyesters can be utilized. A preferred type is described in R. J. Herold U.S. Pat. No. 3,538,043 which is hereby fully incorporated by reference. Typically, the polyesters are made by interpolymerization of maleic anhydride with oxiranes substituted with alkyls containing from 0 to 4 carbon atoms. Examples of oxiranes include ethylene oxide, propylene oxide, and butylene oxides. In addition to maleic anhydride, other anhydrides can be utilized in amounts up to 50 mole percent (i.e. from 0 to 50 mole percent) of the total anhydride charge, wherein said anhydride has from 4 to 10 carbon atoms, such as phthalic anhydride, nadic anhydride, methyl nadic anhydride, tetrahydrophthalic anhydride, succinic anhydride, and cyclohexane-1,2-dicarboxylic acid anhydride. The molar ratio of oxirane to anhydride can be from about 1.0 to about 2.0, and preferably from about 1.0 to about 1.3. An excess of oxirane is preferred in the preparation of the polyesters so that the final product has a low content of carboxylic acid end groups and a high content of hydroxyl end groups.

In the preparation of the unsaturated polyesters from oxiranes and anhydrides, small amounts of initiators are utilized as from about 5 to about 30 parts by weight per 100 parts by weight of the polyester forming monomers. Examples of specific initiators include polyols, for example diols, triols, tetrols, having from 2 to 12 carbon atoms, or dicarboxylic acids containing from 3 to 10 carbon atoms, as for example fumaric acid, succinic acid, glutaric acid, and adipic acid. The molecular weight of the polyol is generally less than 500, preferably less than 200. Diols and dicarboxylic acid initiators result in linear, difunctional polyester chains with an average of two hydroxyl end groups per polymer chain. Triols produce polyester chains with an average of 3 arms and 3 hydroxyl end groups, and tetrols result in 4 arm chains with 4 hydroxyl end groups. Various catalysts can be utilized such as a zinc hexacyano cobaltate complex, and the like, as described in U.S. Pat. No. 3,538,043 which is hereby fully incorporated by reference.

Another type of unsaturated polyester resin which can be utilized in the present invention is the condensation reaction of low molecular weight diols, that is, diols containing from 2 to 12 carbon atoms and desirably from 2 to 6 carbon atoms with carboxylic acids or their anhydrides containing from 3 to 12 carbon atoms and preferably from 4 to 8 carbon atoms provided that at least 50 mole percent of these acids or anhydrides contain ethylenical unsaturation. Examples of diols include 1,2-propylene glycol, ethylene glycol, 1,3-propylene glycol, diethylene glycol, di-1,2-propylene glycol, 1,4-butanediol, neopentyl glycol, and the like. A preferred diol is 1,2-propylene glycol. Preferred acids include fumaric acid, maleic acid, whereas preferred anhydrides include maleic anhydride. Often, mixtures of acids and/or anhydrides are utilized with the preferred acids or anhydrides and such compounds include phthalic anhydride, isophthalic acid, adipic acid, glutaric acid, and the like.

Regardless of whether an unsaturated polyester is utilized made from an oxirane or a diol, the molecular weight thereof is from about 1,000 to about 10,000 and preferably from about 1,200 to about 5,000.

It is an important aspect of the present invention that the unsaturated polyesters are essentially free of carboxyl end groups and contain high amounts of hydroxyl end groups which can either be primary, secondary, or tertiary. The amount of such hydroxyl end groups is at least 50 percent, desirably at least 70 percent, and preferably at least 80 percent based upon the total number of end groups of the polyester resin. The mole percent of unsaturated acid moieties in the polyesters is at least 50 percent and preferably at least 70 percent.

Another important component of a typical sheet molding composition of the present invention is an ethylenically unsaturated monomer such as a polymerizable vinyl or allyl compound, such as a vinyl substituted aromatic having from 8 to 12 carbon atoms, as for example, styrene, a preferred monomer, vinyl toluene, divinyl benzene, diallyl phthalate, and the like; acrylic acid esters and methacrylic acid esters wherein the ester portion is an alkyl having from 1 to 10 carbon atoms such as methylacrylate, ethylacrylate, N-butylacrylate, 2-ethyl-hexylacrylate, methyl methacrylate, ethylene glycol dimethacrylate, and the like. Other unsaturated monomers include vinyl acetate, diallyl maleate, diallyl fumarate, vinyl propionate, triallylcyanurate, and the like. Mixtures of the above compounds can also be utilized. The total amount of the unsaturated monomers generally varies from about 20 percent to about 50 percent and desirably from about 30 percent to about 40 percent by weight based upon the total weight of the ethylenically unsaturated monomers and the polyester. The amount of the polyester is thus the difference.

In addition to the above two basic or fundamental components, various other components or additives can be utilized to form the sheet molding compound composition. For example, various thermoplastic polymers (low profile or low shrinkage compounds) can be utilized as set forth in U.S. Pat. No. 4,525,498 which is hereby fully incorporated by reference. Typical low profile compounds include polyvinyl acetate, saturated polyesters, polyacrylates or methacrylates, saturated polyester urethanes, and the like, which is hereby fully incorporated by reference. The amount of such polymers is from about 10 parts by weight to about 50 parts by weight, with from about 20 parts by weight to about 40 parts by weight being preferred based upon the level of unsaturated polyester/styrene mixture. Other additives which can also be utilized are known to the art and to the literature and include organic peroxides, e.g., tert. butyl perbenzoate (free radical polymerization catalyst); p-benzoquinone (free radical polymerization inhibitor), internal mold release agents such as zinc stearate; mineral fillers such as calcium carbonate, Dolomite, clays and hydrated alumina, and the like.

The above-noted unsaturated polyesters and the various olefinic unsaturated monomers are thickened by the in situ reaction of a diisocyanate with a diamine to form a polyurea. The type of diamine is very important to the present invention. Desired types include primary aromatic diamines which have basicity reducing substituents on the same benzene ring, preferably in para- and/or ortho-position to the amino groups, such as ester-or keto- groups. The functions of these substituents are (a) to reduce the initial reaction rates with diisocyanates (to allow satisfactory filler wetting and paste mixing), (b) to prevent addition of the amino groups to the double bonds of the unsaturated polyester resins and (c) to facilitate dissolution or dispersion of the diamines in the paste. Due to their higher basicity and nucleophilicity, aliphatic diamines, as well as aromatic diamines outside of the above definition, are not suitable as polyurea precursors for this invention. Such non-suitable compounds, besides their excessively rapid reaction with diisocyanates, also show a strong tendency to add to the unsaturated polyester resins and thus cause premature irreversible crosslinking of these resins thereby impeding proper paste flow during molding. Also not suitable are secondary diamines, aromatic or aliphatic, i.e., with only one hydrogen per amino group: —NRH (such as those used in prior art patent, U.S. Pat. No. 4,296,020). The relative inertness of the aromatic diamines of the present invention towards unsaturated polyester resins, on the other hand, permits predissolving or predispersing the diamines in the polyester component, prior to mixing with the other compounds of the paste.

The typical generic structures of the diamines of the present invention are:

FORMULA (I)

[benzene ring with substituents $R_1, R_2, R_3, R_4, R_5, R_6$]

FORMULA (II)

where $R_1$ is —(A)$_z$—[benzene ring with substituents $R_7, R_8, R_9, R_{10}, R_{11}$]

or the same as any of $R_2$ through $R_6$, and wherein the $R_2$ through $R_6$ as well as the $R_7$ through $R_{11}$ groups are independently selected from the groups of:

H; NH$_2$; C$_1$ to C$_5$ alkyl; phenyl; an ester such as $$-\overset{O}{\underset{\parallel}{C}}-OR_{12}$$

(where $R_{12}$=C$_1$ to C$_6$ alkyl); or an amide such as $$-\overset{O}{\underset{\parallel}{C}}-N(R)_{13}R_{14}$$

(where $R_{13}$=H or CH$_3$; and $R_{14}$=C$_1$ to C$_6$ alkyl or H);

provided that there are no more and no less than 2 NH$_2$ groups per molecule.

Small amounts, that is less than 10 mole percent of the total of the diamines, of mono- and/or triamines of structure I and/or II can be used in addition to the diamines of Formulas I and II. The mono- and triamines have one and three NH$_2$ groups per molecule, respectively, and also have ring substituents, reducing the basicity of the amino groups, such as: ester or amide groups. The amount of monoamines should not reduce the anticipated average molecular size of the polyureas, obtained from reaction with the diisocyanates, to less than four urea moieties per average molecule. The amount of triamines must be less than the minimum required to form a three-dimensional network. Combinations of mono-and triamines may be used to prevent both network formation and formation of polyureas that are too short.

A in Formula II independently is a group such as oxygen, sulfur, sulfoxide, C$_1$ to C$_6$ alkylene, C$_2$ to C$_{20}$ oxa- and/or thia-alkylene, carbonyl, or:

$$-\overset{O}{\underset{\parallel}{C}}-X-B-X-\overset{O}{\underset{\parallel}{C}},$$

wherein X is O or NR$_{15}$; and wherein B independently is selected from the groups C$_2$ to C$_{12}$ alkylene, C$_4$ to C$_{60}$ oxa- and/or thia-alkylene, such as:

$(\text{CH}_2-\text{CH}_2-\text{O})_m\text{CH}_2\text{CH}_2,\ (\text{CH}_2-\text{CH}_2-\text{S})_n\text{CH}_2-\text{CH}_2,$ $$(\text{CH}_2-\overset{\text{CH}_3}{\underset{|}{\text{CH}}}-\text{O})_o\text{CH}_2-\overset{\text{CH}_3}{\underset{|}{\text{CH}}}-,\ -[(\text{CH}_2)_4\text{O}]_p(\text{CH}_2)_4,$$

and the like, or difunctional residues of alkylene esters or polyesters (max. MW=1,000, preferably <500), derived from C$_2$ to C$_8$ diols and C$_4$ to C$_8$ dicarboxylic acids or their respective anhydrides, saturated or unsaturated. $R_{15}$=H or CH$_3$; z=zero or 1, and m, n, o, or p independently is 1 to 16. Any combinations of aromatic diamines can also be used. Preferred diamines of the present invention include (1) trimethylene glycol di-p-aminobenzoate (trade name: Polacure 740M; Polaroid Corp.; a preferred compound having the formula:

[structure: $H_2N$—phenyl—$\overset{O}{\underset{\parallel}{C}}$—O—(CH$_2$)$_3$—O—$\overset{O}{\underset{\parallel}{C}}$—phenyl—NH$_2$]

(2) polytetramethylene oxide-di-p-aminobenzoate (Polamine-1,000; Polaroid Corp.); a compound having the formula:

[structure: $H_2N$—phenyl—$\overset{O}{\underset{\parallel}{C}}$—O—[(CH$_2$)$_4$O]$_n$—$\overset{O}{\underset{\parallel}{C}}$—phenyl—NH$_2$]

n ≈ 14; $\overline{MW}$ ≈ 1240

(3) 5,5′-methylene-bis-(2-amino-o-methyl benzoate); Curene 155 (Anderson Development Co.); a compound having the formula:

[structure: $H_2N$—phenyl(with C(=O)OCH$_3$ ortho substituent)—CH$_2$—phenyl(with C(=O)OCH$_3$ ortho substituent)—NH$_2$]

(4) isobutyl-4-chloro-3,5-diaminobenzoate; Baytec 1190X (Mobay Chemical Corp.). Generally, C$_1$ to C$_{12}$ alkyl ester derivatives of Baytec 1190X are useful.

Examples of other useful diamines include tetramethylene glycol di-o-aminobenzoate, hexamethylene glycol di-p-aminobenzoate, pentamethylene di-p-aminobenzamide, thiodiethylene glycol di-p-aminobenzoate, and the like.

Examples of monoamines include p- or m-aminomethyl benzoate, p- or m-aminobenzamide, p- or m-chloroaniline, and the like.

Examples of triamines include 2,4,6-triaminomethyl benzoate, and the like.

Considering the diisocyanates, they generally have the formula R(NCO)$_a$ where a is from about 1.8 to about 2.4, desirably from about 1.9 to about 2.3, with approximately 2.0 being preferred and where R is a hydrocarbyl such as an aliphatic group, for example alkylene, an aromatic group such as phenylene, an aliphatic substituted aromatic such as an alkyl substituted aromatic or an alkylene substituted aromatic, an aromatic substituted aliphatic such as methylenebisphenylene, and the like, having a total of from about 4 to about 25 carbon atoms with from about 6 to about 15 carbon atoms being preferred. Examples of suitable isocyanates include 1,6-diisocyanato hexane, 2,2,4- and/or 2,4,4-trimethyl hexamethylene diisocyanate, p- and m-tetramethyl xylene diisocyanate, dicyclohexyl methane-4,4'-diisocyanate (hydrogenated MDI), 4,4'-methylene diphenyl isocyanate (MDI), p- and m-phenylene diisocyanate, 2,4- and/or 2,6-toluene diisocyanate (TDI), durene-1,4-diisocyanate, isophorone diisocyanate, isopropylene-bis-(p-phenyl isocyanate) and sulfone-bis-(p-phenyl isocyanate). Also useful are diisocyanates, prepared by capping low molecular weight, that is less than 300, diols, ester diols or diamines with diisocyanates, such as the reaction products of one mole of 1,4-butanediol or bis-(4-hydroxybutyl)-succinate (molecular weight=262) with two moles of hexamethylene diisocyanate. Any combination of the above diisocyanates can also be utilized. Combinations of slower reacting aliphatic with faster reacting aromatic diisocyanates can be used advantageously to balance reactivity and rate of thickening. Preferred diisocyanates include MDI, 1,6-diisocyanato hexane, and TDI. The most preferred diisocyanate is a modified liquid MDI having an isocyanate content of approximately 7.3 meq. NCO/gm and is sold under the brand name of Isonate 191, by Dow Chemical Company.

The molar ratio of isocyanate to the amino groups is generally from about 0.6 to about 1.4 and preferably from about 0.8 to about 1.2. An effective amount of the thickener (urea groups) is utilized to achieve a suitable viscosity plateau and/or stability period with regard to subsequent molding. Such results are achieved utilizing as little as about 10 millimoles of urea groups per 100 grams by weight of the molding resin, that is the polyester and the ethylenically unsaturated monomers such as styrene. Generally, from about 12 to about 40 millimoles are utilized, with from about 15 to about 30 millimoles being preferred.

A desirable mixing of the SMC paste compound is in the following sequence: liquid components are charged first (except for the diisocyanates). To the liquid can be added the diamine compound, especially if it is a solid; the diamine may be dispersed and thereafter the other solid compounds, e.g., the fillers, can be mixed in by the use of a high speed, high torque stirrer. Most advantageously, the diisocyanate compound is added last and mixed. The mixing sequence can be changed, thus the diamine can be added after the filler is mixed. For continued operation, it may be advantageous to disperse the diamine and the diisocyanate separately in liquid components of a given formulation, then mix in the solid components (e.g., fillers and mold release agents) in both batches in appropriate proportions, and finally combine and blend the two mixtures to obtain the final SMC composition.

Contrary to the conventional maturation of polyester based SMC, the thickening reaction with "in paste" formed polyureas does not rely on carboxyl or any other functional end groups on the polyester resins. It has thus been found that polyesters containing any significant amount of carboxyl end groups are undesirable for use in the present invention because they substantially shorten the initial time during which the mixture has low (<100,000 cps) viscosity. Low viscosity is required for adequate flow and wet out of fiber reinforcement during SMC preparation. Hence, as noted above, the unsaturated polyesters of the present invention are essentially free of carboxyl end groups.

Figure 1:
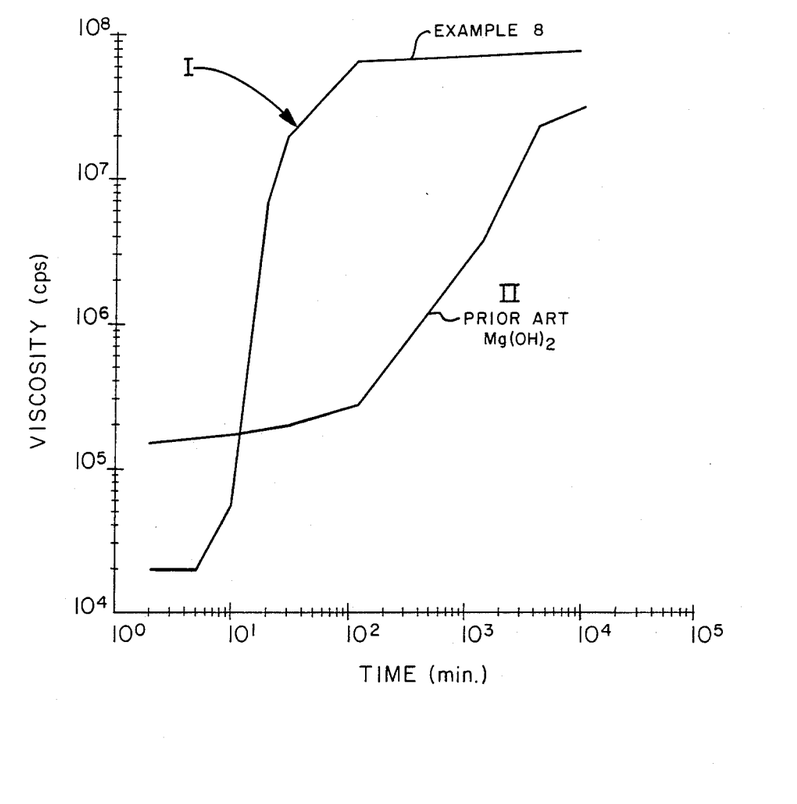
FIG. 1 relates to SMC maturation plots of (1) a composition of the present invention and (2) a prior art composition, maturated with $(MgOH)_2$.

FIG. 1 relates to a comparison of maturation curves comparing the present invention with a conventional $Mg(OH)_2$ control. The curves demonstrate the advantage of this invention over the prior art technology: (1) lower initial paste viscosity than the control which ensures good wetting of the glass fiber, (2) steep rise in viscosity thereafter, and (3) leveling off after reaching a viscosity level high enough for molding. While the polyurea maturated pastes are stable and moldable for months, the pastes matured by the prior art technology become unusable after a relatively short period of time, usually within one week to two weeks.

An important aspect of the present invention is that the utilization of an unsaturated polyester resin in association with an ethylenically unsaturated monomer thickened with the polyurea polymers formed utilizing the above-noted diisocyanate compounds and primary aromatic diamines having basicity reducing substituents thereon results in quickly obtaining a desired viscosity which levels out and is suitable for molding into a desired shape. Once the various components have been mixed, a suitable molding viscosity plateau is achieved generally within from about 2 to about 12 hours and desirably from about 3 to about 6 hours at ambient temperature. The viscosity of the plateau is from about 20 million to about 120 million centipoises and preferably from about 50 million to about 90 million centipoises as measured by a Brookfield viscometer. An unexpected result is the retention or stability of the viscosity plateau which is at least about one month, desirably at least about three months, and preferably for periods of time up to about five or six months and even higher. Thus, the sheet molded compounds of the present invention once formed can be stored anywhere from approximately one to about six months without any significant increase in viscosity so that they can subsequently be heated and molded into any desirable shape.

Another aspect of the present invention is that the combination of aromatic amines with basicity reducing substituents and aromatic diisocyanates when used to thicken polyesters which have a low carboxylic acid content have a definite open time (i.e., induction time or pre-reaction time) before the viscosity suddenly increases to the high viscosity plateau needed for molding. This open time which varies from 10 to 40 minutes is necessary to allow good glass wet out by the paste composition and allow making of SMC sheets using necessary processing equipment. It has been found that in order to obtain such open times with these aromatic amines and diisocyanates, polyesters with less than 30 mole percent acid group functionality (based on total number of acid and hydroxyl groups) is desired with less than 20 percent carboxylic acid groups being preferred. Such polyesters are most conveniently made by the zinc hexacyanocobaltate complex catalyzed reaction of oxiranes and cyclic anhydrides which are described hereinabove.

The molding resin compositions of the present invention are desirably reinforced with various fibers. In the process to make sheet molding compounds (SMC), continuous strand fiber glass rovings are chopped into one inch lengths and spread on a conveyor belt, which is transporting a layer of the above-noted paste mixture. The chopped glass/SMC paste mixture is laminated between polyethylene carrier sheets and compressed with compaction rollers or belts to enable through glass wetout. The entire process takes place at room temperature. The SMC paste is thus laminated with the chopped glass fibers immediately after paste mixing when the viscosity is lowest (see figure) and glass wetout is maximum. The resultant SMC is then allowed to mature or increase in viscosity until the viscosity plateau ($20-120 \times 10^6$ cps) is reached at which time it is ready for molding into a desired shape.

Generally, any reinforcing fiber can be utilized such as glass, aramid, nylon, polyester, graphite, and the like, with glass fiber being highly preferred. The amount of reinforcing fiber utilized can be nil, that is optional, or in an amount as from about 0 or 1 percent to about 60 percent by weight based on the total weight of said molding resin, that is said unsaturated polyester and said ethylenically unsaturated monomers and said fibers, and preferably from about 20 to about 50 weight percent by weight.

Still another major component in the sheet molding compound is an inorganic filler which functions to contribute to favorable mold flow or rheology as well as lower cost. Numerous fillers can be utilized although finely ground calcium carbonate is preferred. The filler content in the SMC composition can range from 0 to 70 percent by weight with about 30 to 60 percent by weight being preferred based upon said unsaturated polyester and said ethylenically unsaturated monomers. In addition to calcium carbonate, several other fillers can be included in lesser amounts such as clays, talcs, zinc borate, aluminum trihydrate, perlite, vermiculite, hollow glass or solid glass microspheres, and the like.

Other additives include mold release agents such as the metal stearates, antioxidants such as benzoquinone to prevent premature irreversible gellation caused by free radical induced polymerization, pigments to provide color and catalysts (most preferred catalysts are peroxides such as benzoyl peroxide and t-butylperoxybenzoate). These additional additives are used in conventional amounts as set forth in the typical formulations described in the examples.

When it is desired to make a suitable end product, fully matured SMC sheets are cut to the appropriate size and weight and placed into the mold cavity of a compression press. Molding is carried out under heat as from about 140° to 400° F. and preferably from about 250° to about 350° F. utilizing a pressure of from about 100 to about 4,000 psi and preferably from about 500 to about 1000 psi for an appropriate period of time as from about 30 seconds to about 5 minutes. Under these conditions, the SMC sheets flow and fill the mold cavity and a crosslinking reaction occurs in which the styrene reacts with the unsaturated polyester. This process is commonly used to mold automotive structural and appearance parts such as hoods, fenders, doors, roofs, trunk lids, inner panels, and vehicle underbodies. In addition to automotive parts, other products can be molded using this process such as appliance and business machine housings, sanitary ware (bathroom shower, tub and sink units), marine applications (boat structures), snowmobile housings, and structures for farm machinery.

The invention will be better understood by reference to the following examples.

EXAMPLES 1-11 (TABLE II)

In these examples, it is shown that a range of isocyanate indices (NCO/NH) ratios can be used at a wide range of urea concentrations. In the examples, the diamine was Polacure 740M from Polaroid Corp.* Chemical name: trimethylene glycol di-p-aminobenzoate. Structure:

Formula Weight: 314 (6.37 meq $NH_2$/g) The diisocyanate was Isonate 191; "Liquid MDI"; about 7.3 meq. NCO/g from Dow Chemical Corp.

The SMC paste formulation is shown in Table I. The polyester used is a polypropylene fumarate of $MW \approx 2,000$ and almost totally hydroxy-terminated. It was used in Examples 1-11. The polyester was prepared from maleic anhydride and propylene oxide using a zinc hexacyanocobaltate catalyst as described in U.S. Pat. No. 3,538,043 and U.S. Pat. No. 3,576,909.

The mixing of components was done in the sequence shown in Table I. Polacure 740M was blended in before zinc stearate and snowflake. Isonate 191 was added last. Blending was done with a high speed laboratory mixer in about 5 to 10 minutes. Final paste temperatures are usually about 35° C. ($\pm 5°$ C.). First viscosity measurement (Brookfield at 1 RPM) was done after two minutes and subsequently as shown in Table II. At low viscosities (up to approximately $10^6$ cps) spindle TA was used; in the range of about 1 to $5 \times 10^6$ cps, spindle TC, and at higher viscosities spindel TF was used.

Charges of Polacure and Isonate are shown in Table II. NCO/$NH_2$ ratios were varied between 0.69 and 1.37. Results demonstrate the following:

(a) The "in situ" polyurea maturation works very well with non-carboxyl terminated polyester systems.

(b) Polyurea thickening is rapid and effective over a broad range of NCO/$NH_2$ charge ratios: from 0.69 to 1.37. Pastes are moldable in ca. 2 to 5 hours.

(c) The maturation profiles (graphically shown for Example 8 in the Figure) exhibit very desirable curvatures: initial viscosities are very low and practically flat for at least 5 or 10 minutes. Thereafter, they rise exponentially, reaching stable plateaus after 2 to 5 hours.

(d) The pastes have good shelf stability (up to three to five months).

(e) OH end groups on polyester are essentially inert and not required for the maturation mechanism, as comparison of Examples 1 through 5 vs. Examples 6 through 11 (i.e., no indication of OH/NCO reaction).

Example 5 was scaled-up by a factor of 25. The incorporation of ca. 28 weight percent of 1-inch chopped glass fiber was done on a small SMC machine; 16-inch² test sheets were compression molded (ca. 2 minutes/300° F./1,000 to 1,200 psi), after 3 hours, 5 hours and 4 days. The glass filled paste remains moldable for many months. Test results for notched impact, tensile flexural strength and modulus are listed in Table III. Mold shrinkage of the glass-free sample was 0.15 percent after 1 day and 0.14 percent after 11 days.

Table III also shows test results of glass filled SMC samples, made with the prior art (magnesium oxide) maturation systems, as indicated.

EXAMPLES 12-14

Maturation of a Commercial Polyester Based SMC With POLACURE-740M/ISONATE 191

SMC paste formulations were prepared using a commercial polyester (RP-325) available from Owens Corning Fiberglass. This polyester is essentially polypropylene fumarate in a styrene solution. It has a moderate level of carboxylic acid end groups in addition to a significant level of hydroxyl end groups (Table IV). This polyester was compounded with the ingredients as shown in Table V. The low profile additive used in this experiment was LP-90 (polyvinyl acetate) available from Union Carbide Corporation. For urea maturation, the diamine used was Polacure 740M and the diisocyanate utilized was Isonate 191, as in Examples 1-11. Three different urea concentrations were studied. In all cases, the following mixing procedure was used:

(1) All ingredients (polyester through the Polacure) (Table V) are weighed into an 800 ml beaker and mixed for 30 seconds.

(2) Zinc stearate and the Snowflake were added to the above mixture and mixed for 90 seconds at high shear.

(3) The liquid MDI was then added to the above mixture and mixed at high shear rates for 60 seconds.

(4) Viscosity measurements were done using a Brookfield Viscometer equipped with a helipath drive and a T-F spindle at 1 RPM. Results of this study are shown in Table VI. The results show an extremely fast viscosity rise for these formulations.

EXAMPLES 15-17

Maturation of a Commercial Polyester Based SMC With CURENE 442/ISONATE 191

SMC paste formulations were prepared exactly as in Examples 12-14 except that Curene 442 was used as the amine compound. The exact formulation used is shown in Table VII. The results of Brookfield viscosity measurements are shown in Table VIII. Extremely fast viscosity increases were also observed for these formulations.

EXAMPLES 18-26

Maturation of Hydroxyl-Terminated Polyester Based SMC With POLACURE-740M/ISONATE 191

SMC paste formulations were prepared exactly as described for Examples 12-14 except that three different unsaturated polyesters were used. These polyesters (Table IV) were prepared as described in Examples 1-11. These polyesters are polypropylene fumarates with essentially all hydroxyl end groups. The acid number of these polyesters is very low compared to the polyester used for Examples 12-17 (Table IV). The results of Brookfield viscosity measurements on the SMC pastes are shown in Table IX. The data show that the initial viscosity is low and remains constant for at least 10-15 minutes. This length of time is needed for combining the paste resin mixture with the chopped glass fibers on an SMC machine and to ensure good glass wetout. After this initiation time, the viscosity increases very rapidly to the high level needed for compression molding of SMC.

EXAMPLE 27

The recipe used for Example 15 was scaled up by a factor of 25. Mixing was done under high shear using a Cowles type mixer. Mixing was done in the sequence described for Examples 15-17. The Isonate 191 was added last after all of the previous ingredients were well mixed. After the addition of the Isonate 191, mixing was continued for 60 seconds and the final SMC slurry was poured into the doctor boxes of a small laboratory SMC machine. The SMC machine was run at a belt speed of 16 feet/minute. Glass rovings were chopped at a rate intended to give a final SMC sheet containing 28 percent by weight of glass. The viscosity of the SMC paste formulation (identical to Example 15) increased so rapidly that it was not possible to feed the paste through the doctor box and produce SMC. This result demonstrates that with a typical polyester containing appreciable carboxylic acid end groups, maturation is too fast to allow SMC manufacture.

EXAMPLE 28

The recipes for Examples 18, 19 and 20 were scaled up by a factor of 25. These recipes were mixed and poured in the doctor boxes of a small SMC machine using the exact same procedure described in Example 27. All three paste recipes fed very well through the machine doctor boxes. SMC sheets containing 18 percent by weight of glass were readily made. After 24 hours, these sheets were compression molded ca. 2 minutes at 150° C./1000 psi into flat FRP moldings with good properties. This result shows that SMC can be readily manufactured when a polyester is used which is substantially free of carboxylic acid groups. The viscosity remains low enough for a sufficient time to allow producing SMC with good glass wet out.

EXAMPLE 29

Effect of Various Di- (or Tri-)amines on SMC Paste Stability

As previously noted, it is an important aspect of this invention that the diamine precursors of the polyureas are essentially inert towards the unsaturated polyester resins under storage conditions. Table X lists the shelf stability of SMC pastes condensing various amino compounds, but no isocyanates. As the proto-type of the diamines of this invention, Polacure-740M does not harden the paste in two weeks; only a slight initial viscosity increase occurs during the first day of storage.

All the other di-(or tri-)amines listed after Polacure in Table X are outside of this invention. All exhibit a lack of inertness in paste formulations. Bulk viscosities of the pastes increase constantly until the pastes harden irreversibly and become totally unusable.

TABLE I

| | | SMC Paste Formulation (Thickeners Not Included) | |
|---|---|---|---|
| Material Code | Charge (g) | Chemical Composition | Supplier |
| B436-92A3* | 86.6 | experimental polyester* resin, containing 20% styrene | GenCorp |
| Neulon T | 82 | polyvinyl acetate low profile additive | Union Carbide |

TABLE I-continued

SMC Paste Formulation
(Thickeners Not Included)

| Material Code | Charge (g) | Chemical Composition | Supplier |
|---|---|---|---|
| | | containing ca. 58% styrene | |
| Styrene | 31.4 | | |
| 10% BQ in DAP | 0.2 | p-benzoquinone in dialkylphthalate | |
| TBP | 2.8 | tert. butyl perbenzoate | Lucidol (Pennwalt) |
| Zinc Stearate | 7.0 | | |
| Snowflake | 366 | $CaCO_3$ | |

*Polypropylene fumarate, OH-terminated
MW ≈ 2,000; ca. 1.0 meq. OH/g; −.018 meq acid/g

TABLE II

Maturation of an OH-Terminated Polyester[1]-SMC Paste with Polacure 740M/Isonate 191[2] ($NCO/NH_2$ = 0.69 to 1.37)

| EXAMPLE: | 1 | 2 | 3 | 4 | 5 | 6 |
|---|---|---|---|---|---|---|
| Polacure (g/formula) | 4.0 | 5.0 | 5.0 | 5.5 | 6.0 | 7.0 |
| meq $NH_2$ | 25.5 | 31.9 | 31.9 | 35.0 | 38.2 | 44.6 |
| Isonate (g/formula) | 4.0 | 5.0 | 6.0 | 5.0 | 6.0 | 6.0 |
| meq NCO | 29.2 | 36.5 | 43.8 | 36.5 | 43.8 | 42.8 |
| $NCO/NH_2$ | 1.15 | 1.14 | 1.37 | 1.04 | 1.15 | 0.96 |
| Mmoles Urea/100 g Resin | 13.0 | 16.0 | 16.0 | 17.5 | 19.0 | 22.0 |
| Brookfield Viscosity at 1 RPM (cps × $10^{-3}$): Time After Mixing | | | | | | |
| 2 min. | 24 | 24 | 20 | 24 | 24 | 20 |
| 5 min. | 24 | 24 | 20 | 24 | 24 | 24 |
| 10 min. | 28 | 28 | 28 | 28 | 28 | 24 |
| 20 min. | 76 | 4,000 | 6,180 | 3,000 | 4,600 | 1,192 |
| 30 min. | 1,364 | 14,200 | 14,800 | 11,000 | 16,000 | 16,800 |
| 1 hr. | 11,200 | 24,200 | 25,400 | 20,400 | 37,200 | 27,800 |
| 2 hr. | 20,000 | 27,800 | 32,600 | n.d. | n.d. | n.d. |
| 4 hr. | 28,600 | 41,600 | 44,200 | n.d. | 50,000 | n.d. |
| 1 day | n.d.[3] | 46,400 | 55,800 | 46,400 | n.d. | 52,600 |

| EXAMPLE | 7 | 8 | 9 | 10 | 11 |
|---|---|---|---|---|---|
| Polacure (g/formula) | 7.0 | 8.0 | 8.0 | 9.0 | 10.0 |
| meq $NH_2$) | 44.6 | 51.0 | 51.0 | 57.3 | 63.7 |
| Isonate (g/formula) | 5.0 | 6.0 | 7.0 | 6.0 | 6.0 |
| meq NCO | 36.5 | 43.8 | 51.0 | 43.8 | 43.8 |
| $NCO/NH_2$ | 0.82 | 0.86 | 1.0 | 0.76 | 0.69 |
| Mmoles Urea/100 g Resin | 18.0 | 22.0 | 25.5 | 22.0 | 22.0 |
| Brookfield Viscosity at 1 RPM (cps × $10^{-3}$): Time After Mixing | | | | | |
| 2 min. | 20 | 20 | 24 | 24 | 20 |
| 5 min. | 20 | 20 | 24 | 24 | 20 |
| 10 min. | 36 | 56 | 968 | 512 | 1,340 |
| 20 min. | 5,760 | 6,600 | 12,200 | 10,200 | 16,600 |
| 30 min. | 15,200 | 20,000 | 24,600 | 20,400 | 25,000 |
| 1 hr. | 30,000 | 31,600 | 35,000 | 42,400 | 40,000 |
| 2 hr. | 36,000 | 60,600 | 56,400 | 49,200 | n.d. |
| 4 hr. | 50,400 | n.d. | n.d. | n.d. | n.d. |
| 1 day | 67,000 | 74,400 | 56,400 | 59,800 | 84,000 |
| 3 days | | 76,000 | | | |
| 7 days | | 78,000 | | | |

[1]B436-92A3 = poly(propylene fumarate); MW ≈ 2,000; ca. 1.0 meq OH/g; 0, .018 meq. acid/g (SMC paste formulation, see Table I)
[2]Liquid MDI (UpJohn Co.); ca. 7.3 meq NCO/g
[3]n.d. = not determined

TABLE III

Test Results of Urea-Maturated SMC Sheets (ca. 28% Glass Fiber)

| Example: | 5[1] | | | Control[2] |
|---|---|---|---|---|
| Sheet No.: | 1 | 2 | 3 | |
| Time Molded[3] After Mixing | 3 hrs. | 5 hrs. | 4 days | About 2 days |
| System | Polacure 740/MDI | | | MgO Maturated |
| $NCO/NH_2$ | 1.15 | | | — |
| Mmoles Urea/100 g Resin | 19 | | | — |
| Notched Impact (ft.lbs./in.) | 16.7 (±2.5) | 15.2 (±3.5) | 7.9 (±3.0) | 15.4 (±5.5) |
| Tensile Strength | 6.7 | 7.4 | 8.85 | 9.95 |

TABLE III-continued

Test Results of Urea-Maturated SMC Sheets (ca. 28% Glass Fiber)

| Example: | 5[1] | | | Control[2] |
|---|---|---|---|---|
| Sheet No.: | 1 | 2 | 3 | |
| (psi × $10^3$) | (±1.5) | (±1.9) | (±1.5) | (±1.6) |
| Flexural Strength | 23.9 | 20.8 | 23.3 | 22.7 |
| (psi × $10^3$) | (±3.6) | (±5.8) | (±2.0) | (±5.1) |
| Flexural Modulus | 1.80 | 1.56 | 1.69 | 1.47 |
| (psi × $10^6$) | (±0.14) | (±0.23) | (±0.13) | (±0.24) |
| Perpendicular Tensile at 300° F. | 1.083 | 1.115 | — | 1.055 |

TABLE III-continued

Test Results of Urea-Maturated SMC Sheets (ca. 28% Glass Fiber)

| Example: | 5[1] | | | Control[2] |
|---|---|---|---|---|
| Sheet No.: | 1 | 2 | 3 | |
| (psi × 10³) | (±0.081) | (±0.055) | — | (±0.072) |

[1]Paste Formulation in Table I
[2]Paste Formulations similar to above, but with a commercial polyester resin: RP-325 (Owens-Corning Fiberglas)
[3]Molded at ≈ 150° C. for ca. 2 min. at a gauge pressure of ca. 1,000 psi

TABLE IV

Polyester Used for Examples 12–26

EXAMPLES 12–17

A commercial polyester (RP-325) available from Owens Corning Fiberglas. Essentially polypropylene fumarate.

| Acid Number | 19.8 | % Styrene | 33.8 |
|---|---|---|---|
| Hydroxyl Number | 32.8 | Molecular Weight | 1413 |

EXAMPLES 18–20

A linear polypropylene fumarate prepared using zinc hexacyanocobaltate catalyst.

| Acid Number | 0.13 | % Styrene | 20 |
|---|---|---|---|
| Hydroxyl Number | 74.1 | Molecular Weight | 1209 |

EXAMPLES 21–23

A linear polypropylene fumarate prepared using zinc hexacyanocobaltate catalyst.

| Acid Number | 0.23 | % Styrene | 20 |
|---|---|---|---|
| Hydroxyl Number | 44.2 | Molecular Weight | 2020 |

EXAMPLES 24–26

A branched polypropylene fumarate prepared using zinc hexacyanocobaltate catalyst.

| Acid Number | 3.1 | % Styrene | 20 |
|---|---|---|---|
| Hydroxyl Number | 59.4 | Molecular Weight | 2154 |

TABLE V

SMC PASTE FORMULATIONS

| Ingredient | 12,18,21,24 (grams) | 13,19,22,25 (grams) | 14,20,23,26 (grams) |
|---|---|---|---|
| Unsaturated Polyester* | 96.30 | 96.30 | 96.30 |
| LP-90 (Polyvinyl acetate) | 85 | 85 | 85 |
| Styrene | 26.7 | 26.7 | 26.7 |
| Lupersol 256 (Peroxide) | 0.6 | 0.6 | 0.6 |
| t-butylperoxybenzoate | 2.5 | 2.5 | 2.5 |
| 10% Benzoquinone in Diallyl Phthalate | 0.5 | 0.5 | 0.5 |
| Polacure 740M | 4.0 | 6.0 | 8.0 |
| Zinc Stearate | 11.5 | 11.5 | 11.5 |
| Snowflake (CaCO₃) | 368 | 368 | 368 |
| Isonate 191** | 3.5 | 5.25 | 7.0 |
| (Meq NCO) | 25.0 | 37.5 | 50.0 |
| (Meq NH₂) | 25.5 | 38.2 | 51.0 |
| (NCO/NH₂) | 0.98 | 0.98 | 0.98 |

*Polyesters are described in Table IV
**"Liquid MDI"

TABLE VI

Brookfield Viscosity (CPS × 10⁻³) TF Spindle at 1 RPM

| Time (Minutes) | 12 | 13 | 14 |
|---|---|---|---|
| 3 | 600 | 1,800 | 9,600 |
| 4 | 1,200 | 4,800 | — |
| 5 | 2,000 | 7,200 | 12,000 |
| 6 | 2,600 | 8,000 | 13,000 |
| 7 | 2,800 | 9,400 | — |
| 8 | 4,200 | 11,800 | 28,000 |
| 9 | 6,000 | 12,600 | 29,400 |
| 10 | 6,000 | 13,400 | — |
| 11 | 6,000 | — | — |
| 12 | 7,000 | — | — |
| 13 | 7,400 | — | — |
| 14 | 8,800 | — | — |
| 15 | 8,400 | — | — |
| 1 day | 29,000 | 55,000 | 90,500 |

TABLE VII

SMC Paste Formulations

| Ingredient | 15 (grams) | 16 (grams) | 17 (grams) |
|---|---|---|---|
| RP-325 (Polyester) | 115 | 115 | 115 |
| LP-90 (Polyvinylacetate) | 85 | 85 | 85 |
| Styrene | 8.0 | 8.0 | 8.0 |
| Lupersol 256 (Peroxide) | 0.6 | 0.6 | 0.6 |
| t-butylperoxybenzoate | 2.5 | 2.5 | 2.5 |
| 10% Benzoquinone in Diallyl Phthalate | 0.5 | 0.5 | 0.5 |
| Curene 442 | 3.4 | 5.1 | 6.8 |
| Zinc Stearate | 11.5 | 11.5 | 11.5 |
| Snowflake (CACO₃) | 368 | 368 | 368 |
| Isonate 191 | 3.5 | 5.25 | 7.0 |
| (Meq NCO) | 25.0 | 37.5 | 50.0 |
| (Meq NH₂) | 25.5 | 38.2 | 51.0 |
| (NCO/NH₂) | 0.98 | 0.98 | 0.98 |

TABLE VIII

Brookfield Viscosity (cps × 10⁻³) TF SPINDLE AT 1 RPM

| Time Minutes | 15 | 16 | 17 |
|---|---|---|---|
| 2 | — | 3,600 | — |
| 3 | — | 10,400 | 15,000 |
| 4 | 10,000 | 16,000 | — |
| 5 | 11,600 | — | — |
| 1 Day | 59,200 | 70,400 | 78,300 |

TABLE IX

Brookfield Viscosity (cps × 10⁻³) TF SPINDLE AT 1 RPM

| Time (Minutes) | 18 | 19 | 20 | 21 | 22 | 23 | 24 | 25 | 26 |
|---|---|---|---|---|---|---|---|---|---|
| 2 | 400 | 400 | 400 | 400 | 400 | 200 | 200 | 300 | 300 |
| 5 | 400 | 400 | 400 | 400 | 400 | 400 | 400 | 400 | 400 |

TABLE IX-continued

| Time | Brookfield Viscosity (cps × 10⁻³) TF SPINDLE AT 1 RPM | | | | | | | | |
|---|---|---|---|---|---|---|---|---|---|
| | EXAMPLE NUMBER | | | | | | | | |
| (Minutes) | 18 | 19 | 20 | 21 | 22 | 23 | 24 | 25 | 26 |
| 10 | 400 | 400 | 500 | 400 | 400 | 400 | 400 | 400 | 1,800 |
| 15 | 400 | 600 | 1,600 | 500 | 500 | 800 | 500 | 1,400 | 7,400 |
| 17 | 500 | — | — | 500 | 800 | 1,400 | — | 2,800 | 8,000 |
| 20 | 900 | 950 | 3,200 | 700 | 1,000 | 2,000 | 1,200 | 4,000 | 11,200 |
| 22 | 1,000 | — | 4,000 | 800 | — | 3,200 | 1,400 | — | — |
| 25 | 1,500 | 2,600 | 5,400 | 1,000 | 2,200 | 4,800 | — | 5,000 | 14,000 |
| 30 | 2,200 | 3,000 | — | — | 2,800 | 8,000 | 2,800 | — | — |
| 1 day | 33,700 | 74,500 | 94,600 | 32,600 | 68,000 | 93,400 | 44,400 | 72,600 | 94,000 |

TABLE X

Effect of Amino Compounds on SMC - Paste Stability (Ex. 29)

| Amine | pHr[1] | Change in Viscosity | Time to Hardening |
|---|---|---|---|
| This Invention: | | | |
| Polacure-740M | 3.0 | slight during first | no hardening |
| | 6.0 | day - none thereafter | in two weeks (end of test) |
| Outside of This Invention | | | |
| Aromatic Diamine[2] RDX-66884 | 1.5 | fast increase | 2-4 hours |
| TMHMD[3] | 3.0 | increasing | 2 days |
| | 6.0 | increasing | 1 day |
| DETA[4] | 3.0 | fast increase | 5 hours |
| Jeffamine D-230[5] | 3.0 | increasing | 2 days |
| Jeffamine D-400 | 3.0 | increasing | 2 days |
| Jeffamine D-2000 | 6.0 | increasing | 6 days |
| Jeffamine T-403 | 3.0 | increasing | 2 days |

[1]parts/100 parts resin = polyester + styrene
[2]Interez Inc.: allylated phenylene diamine; proprietary composition ($\overline{MW} \approx 150$)
[3]Veba Chemie: trimethylenehexamethylene diamine, mixed isomers
[4]Fisher Scientific Co.: diethylene triamine
[5]Texaco Chemical Co.: polyoxyalkylenediamines (D-230–D-2000) approximately $\overline{MW}$ as indicated by numbers; T-400 triamine ($\overline{MW} \approx 400$)

While in accordance with the Patent Statutes, the best mode and preferred embodiment have been set forth, the scope of the invention is not limited thereto, but rather by the scope of the attached claims.

What is claimed is:

1. A thickened molding resin composition, comprising:

the molding resin, said molding resin containing unsaturated polyesters and an ethylenically unsaturated monomer, said polyester containing at least 70 percent of hydroxyl end groups based upon the total number of end groups therein, the amount of said ethylenically unsaturated monomer being from about 20 percent to about 50 percent by weight based upon the total weight of said ethylenically unsaturated monomer and said unsaturated polyester, said molding resin containing and thickened by the in situ reaction of a diisocyanate and a primary aromatic diamine molecule having basicity reducing substituents on the aromatic nucleus to form an effective amount of a polyurea so that said molding resin has a viscosity plateau of from about 20 million to about 120 million centipoises, said diisocyanate having the formula $R(NCO)_a$ where R is an aliphatic, an aromatic, an aliphatic substituted aromatic, or an aromatic substituted aliphatic having a total of from 4 to 25 carbon atoms, wherein a is from about 1.8 to about 2.4, said primary aromatic diamine molecule having the formula where $R_2$ through $R_6$ is independently selected from the groups of:
H; $NH_2$; $C_1$ to $C_5$ alkyl; phenyl; an ester group, where $R_{12} = C_1$ to $C_6$ alkyl; or an amide group where $R_{13} = H$ or $CH_3$ and $R_{14} = C_1$ to $C_6$ alkyl or H; and wherein $R_1$ is wherein $R_7$ through $R_{11}$ independently is the same as said $R_2$ through said $R_6$, wherein z is 0 or 1, and wherein A is independently selected from: oxygen, sulfur, sulfoxide, sulfone, $C_1$ to $C_6$ alkylene, $C_2$ to $C_{20}$ oxa- and/or thia-alkylene, carbonyl, or:

wherein X is O or $NR_{15}$ where $R_{15}$ is H or $CH_3$; and
wherein B independently is selected from the groups $C_2$ to $C_{12}$ alkylene, $C_4$ to $C_{60}$ oxa- and/or thia-alkylene,
with the proviso that there are two $-NH_2$ groups per said primary aromatic diamine molecule and wherein said primary aromatic diamine has at least one basicity reducing ester or amide group per molecule.

2. A thickened molding resin composition according to claim 1, wherein said unsaturated polyester has a molecular weight of from about 1,000 to about 10,000, and wherein said ethylenically unsaturated monomer is a vinyl or an allyl compound.

3. A thickened molding resin composition according to claim 2, wherein said unsaturated polyester is made by the (1) interpolymerization of an oxirane substituted with alkyl groups containing from 0 to 4 carbon atoms, with maleic anhydride and from 0 to 50 mole percent of an anhydride having from 4 to 10 carbon atoms, wherein the molar ratio of said oxirane to said anhydride is from about 1.0 to about 2.0, or (2) condensation of a diol having from 2 to 12 carbon atoms with a dicarboxylic acid or an anhydride thereof having from 3 to 12 carbon atoms, and wherein said unsaturated polyester contains at least 80 percent of hydroxyl end groups based upon the total number of end groups therein, wherein said vinyl or allyl ethylenically unsaturated monomer is a vinyl substituted aromatic having from 8 to 12 carbon atoms, an acrylic acid ester or methacrylic acid ester, wherein the ester portion is an alkyl having from 1 to 10 carbon atoms, vinyl acetate, diallyl maleate, diallyl fumarate, vinyl propionate, triallylcyanurate, and combinations thereof.

4. A thickened molding resin composition according to claim 3, wherein said primary aromatic diamine is trimethylene glycol di-p-aminobenzoate, hexamethylene glycol di-p-aminobenzoate, pentamethylene di-p-aminobenzamide, thiodiethylene glycol di-p-aminobenzoate, tetramethylene glycol di-p-aminobenzoate, polytetramethylene oxide-di-p-aminobenzoate, 5,5'-methylene-bis-(2-amino-o-methyl benzoate), isobutyl-4-chloro-3,5-diaminobenzoate, and combinations thereof;
wherein R of said diisocyanate is an alkylene, a phenylene, an alkyl or an alkylene substituted aromatic having a total of from 6 to 15 carbon atoms, and wherein a is from about 1.9 to about 2.3.

5. A thickened molding resin composition according to claim 4, wherein said unsaturated polyester made from diol and a dicarboxylic acid or an anhydride thereof is made from a diol having from 2 to 6 carbon atoms and from fumaric acid, maleic acid, or maleic anhydride, or combinations thereof, wherein said unsaturated polyester has a molecular weight of from about 1,200 to about 5,000, and wherein the molar ratio of said diisocyanate to said aromatic diamine is from about 0.8 to about 1.2.

6. A thickened molding resin composition according to claim 5, wherein said unsaturated polyester is said polyester made from the interpolymerization of said oxirane and said maleic anhydride with from about 0 to about 50 mole percent of a different anhydride having from 4 to 10 carbon atoms, wherein the mole ratio of said oxirane to said anhydride is from about 1.0 to about 1.3, and wherein said effective amount of polyurea is such that said viscosity plateau has a viscosity of from about 50 million to about 90 million centipoise.

7. A thickened molding resin composition according to claim 6, wherein said ethylenically unsaturated monomer is styrene, wherein the amount of said styrene is from about 30 percent to about 40 percent by weight based upon a total weight of said styrene and said unsaturated polyester, wherein said aromatic diamine is trimethylene glycol di-p-aminobenzoate, polytetramethylene oxide-di-p-aminobenzoate, 5,5'-methylene-bis-(2-amino-o-methyl benzoate), or isobutyl-4-chloro-3,5-diaminobenzoate; and wherein said diisocyanate is MDI, TDI, or 1,6-diisocyanato hexane.

8. A thickened molding resin composition according to claim 1, including from about 0 to about 60 percent by weight of reinforcing fiber based upon the total weight of said polyester and said ethylenically unsaturated monomers, wherein said reinforcing fiber is glass, nylon, aramid, polyester, graphite, and combinations thereof.

9. A thickened molding resin composition according to claim 5, including from about 25 percent to about 50 percent by weight of a glass fiber based upon the total weight of said unsaturated polyester, and said ethylenically unsaturated monomer.

10. A thickened molding resin composition according to claim 1, wherein said effective amount of said polyurea is at least 10 millimoles of urea moieties per 100 grams of said ethylene unsaturated monomers and said unsaturated polyester.

11. A thickened molding resin composition according to claim 3, wherein said effective amount of said polyurea is from 12 to 40 millimoles of urea moieties per 100 grams of said ethylene unsaturated monomers and said unsaturated polyester.

12. A thickened molding resin composition according to claim 6, wherein said effective amount of said polyurea is from 15 to 30 millimoles of urea moieties per 100 grams of said ethylene unsaturated monomers and said unsaturated polyester.

13. A thickened molding resin composition according to claim 8, wherein said effective amount of said polyurea is from 12 to 40 millimoles of urea moieties per 100 grams of said ethylene unsaturated monomers and said unsaturated polyester.

14. A thickened molding resin composition according to claim 10, wherein the stability of said viscosity plateau is at least one month.

15. A thickened molding resin composition according to claim 11, wherein the stability of said viscosity plateau is at least three months.

16. A thickened molding resin composition according to claim 14, wherein the stability of said viscosity plateau is at least five months.

17. A process for making a thickened molding resin composition, comprising the steps of:

mixing an unsaturated polyester and an ethylenically unsaturated monomer and forming a mixture, said polyester containing at least 70 percent of hydroxyl end groups based upon the total number of end groups therein, the amount of said ethylenically unsaturated monomer being from about 20 percent to about 50 percent by weight based upon the total weight of said ethylenically unsaturated monomer and said unsaturated polyester, and reacting in situ in said mixture a diisocyanate and a primary aromatic diamine molecule having basicity reducing substituents thereon to form a polyurea, the amount of said polyurea formed being at least 10 millimoles of urea moieties for every 100 grams of said unsaturated polyester and said ethylenically unsaturated monomer, said diisocyanate having the formula $R(NCO)_a$ where R is an aliphatic, an aromatic, an aliphatic substituted aromatic, or an aromatic substituted aliphatic having a total of from 4 to 25 carbon atoms, wherein a is from about 1.8 to about 2.4, said primary aromatic diamine molecule having the formula where $R_2$ through $R_6$ is independently selected from the groups of: H; $NH_2$; $C_1$ to $C_5$ alkyl; phenyl;

ester group, where $R_{12} = C_1$ to $C_6$ alkyl; or an amide group where $R_{13} = H$ or $CH_3$, and $R_{14} = C_1$ to $C_6$ alkyl or H; and wherein $R_1$ is wherein $R_7$ through $R_{11}$ independently is the same as said $R_1$ through said $R_6$, wherein z is 0 or 1, and wherein A is independently selected from: oxygen, sulfur, sulfoxide, sulfone, $C_1$ to $C_6$ alkylene, $C_2$ to $C_{20}$ oxa- and/or thia-alkylene, carbonyl, or:

wherein X is O or $NR_{15}$ where $R_{15}$ is H or $CH_3$; and wherein B independently is selected from the groups $C_2$ to $C_{12}$ alkylene, $C_4$ to $C_{60}$ oxa- and/or thia-alkylene, with the proviso that there are two $-NH_2$ groups per primary aromatic diamine molecule and wherein said primary aromatic diamine has at least one basicity reducing ester or amide group per primary aromatic diamine molecule.

18. A process according to claim 17, wherein at least 50 mole percent of the acid moieties in said polyester contains at least one unsaturated group therein, wherein said unsaturated polyester has a molecular weight of from about 1,000 to about 10,000, wherein said ethylenically unsaturated monomer is a vinyl or an allyl compound, wherein said unsaturated polyester is made by the (1) interpolymerization of an oxirane substituted with alkyl groups containing from 0 to 4 carbon atoms, with maleic anhydride and from 0 to 50 mole percent of an anhydride having from 4 to 10 carbon atoms, wherein the molar ratio of said oxirane to said anhydride is from about 1.0 to about 2.0, or (2) condensation of a diol having from 2 to 12 carbon atoms with a dicarboxylic acid or an anhydride thereof having from 3 to 12 carbon atoms, and wherein said unsaturated polyester contains at least 70 percent of hydroxyl end groups based upon the total number of end groups therein, wherein said vinyl or allyl ethylenically unsaturated monomer is a vinyl substituted aromatic having from 8 to 12 carbon atoms, an acrylic acid ester or methacrylic acid ester wherein the ester portion is an alkyl having from 1 to 10 carbon atoms, vinyl acetate, diallyl maleate, diallyl fumarate, vinyl propionate, triallylcyanurate, and combinations thereof, wherein the molar ratio of said diisocyanate to said aromatic diamine is from about 0.6 to about 1.4.

19. A process according to claim 18, wherein said unsaturated polyester is said polyester made from the interpolymerization of said oxirane and said maleic anhydride with from about 0 to about 50 mole percent of a different anhydride having from 4 to 10 carbon atoms, wherein the mole ratio of said oxirane to said anhydride is from about 1.0 to about 1.3, wherein said primary aromatic diamine is trimethylene glycol di-p-aminobenzoate, hexamethylene glycol di-p-aminobenzoate, pentamethylene di-p-aminobenzamide, thiodiethylene glycol di-p-aminobenzoate, tetramethylene glycol di-p-aminobenzoate, polytetramethylene oxide-di-p-aminobenzoate, 5,5'-methylene-bis-(2-amino-o-methyl benzoate), isobutyl-4-chloro-3,5-diaminobenzoate, and combinations thereof;

wherein R of said diisocyanate is an alkylene, a phenylene, an alkylene, a phenylene, an alkyl or an alkylene substituted aromatic having a total of from 6 to 15 carbon atoms, and wherein n is from about 1.9 to about 2.3, wherein the molar ratio of said diisocyanate to said aromatic diamine is from about 0.8 to about 1.2, wherein said unsaturated polyester has a molecular weight of from about 1,200 to about 5,000, and wherein said polyester contains at least 80 percent of hydroxyl end groups based upon the total number of end groups.

* * * * *